United States Patent
Keralapura et al.

(10) Patent No.: US 8,964,548 B1
(45) Date of Patent: Feb. 24, 2015

(54) SYSTEM AND METHOD FOR DETERMINING NETWORK APPLICATION SIGNATURES USING FLOW PAYLOADS

(75) Inventors: Ram Keralapura, San Jose, CA (US); Antonio Nucci, San Jose, CA (US)

(73) Assignee: Narus, Inc., Sunnyvale, CA (US)

( * ) Notice: Subject to any disclaimer, the term of this patent is extended or adjusted under 35 U.S.C. 154(b) by 662 days.

(21) Appl. No.: 13/039,125

(22) Filed: Mar. 2, 2011

(51) Int. Cl.
 *H04L 12/851* (2013.01)
 *H04L 12/26* (2006.01)

(52) U.S. Cl.
 CPC .......... *H04L 43/022* (2013.01); *H04L 47/2483* (2013.01)
 USPC .......................................... 370/235; 370/392

(58) Field of Classification Search
 USPC .................. 370/229–235, 254, 351, 389, 392
 See application file for complete search history.

(56) References Cited

U.S. PATENT DOCUMENTS

| | | | | |
|---|---|---|---|---|
| 7,089,328 | B1 * | 8/2006 | O'Rourke et al. | 709/245 |
| 7,944,822 | B1 * | 5/2011 | Nucci et al. | 370/229 |
| 8,311,956 | B2 * | 11/2012 | Sen et al. | 706/12 |
| 2007/0171827 | A1 * | 7/2007 | Scott et al. | 370/235 |
| 2008/0225710 | A1 * | 9/2008 | Raja et al. | 370/230.1 |
| 2010/0036903 | A1 * | 2/2010 | Ahmad et al. | 709/202 |

OTHER PUBLICATIONS

Cui, Weidong, et al., "Discoverer: Automatic Protocol Reverse Engineering from Network Traces", Proceedings of 16th USENIX Security Symposium, pp. 199-212. Boston, MA, Aug. 6-10, 2007.
Park, Byung-Chul, et al., "Towards Automated Application Signature Generation for Traffic Identification", Network Operations and Management Symposium, 2008. NOMS 2008, IEEE Apr. 7-11, 2008, pp. 160-167.
Newsome, James, et al., "Polygraph: Automatically Generating Signatures for Polymorphic Worms", 2005 IEEE Symposium on Security and Privacy, May 8-11, 2005, pp. 226-241.

* cited by examiner

*Primary Examiner* — Curtis A Alia
(74) *Attorney, Agent, or Firm* — Fernandez & Associates, LLP

(57) ABSTRACT

A method for profiling network traffic of a network is presented. The method includes obtaining a cohesive flow-set based on a (port number, transport protocol) pair, identifying a statistically representative training set from the flow-set, identifying a network application associated with the (port number, transport protocol) pair, determining a packet content based signature term of the network application based on the training set, generate a nondeterministic finite automaton (NFA) using the signature terms to represent regular expressions in the training set, matching a portion of a new flow to the NFA in real time and identify a server attached to the new flow as executing the network application, and generate an alert in response to the match for blocking the new flow prior to the server completing a task performed using the new flow.

33 Claims, 5 Drawing Sheets

SYSTEM AND METHOD FOR DETERMINING NETWORK APPLICATION SIGNATURES USING FLOW PAYLOADS

CROSS REFERENCE TO RELATED APPLICATIONS

This application is related to U.S. patent application Ser. No. 13/039,180 filed Mar. 2, 2011 and entitled "System and Method for Using Network Application Signatures Based On Term Transition State Machine," which is incorporated herein by reference.

This application is related to U.S. patent application Ser. No. 12/104,723 filed Apr. 17, 2008 and entitled "System and Method for Internet Endpoint Profiling," which is incorporated herein by reference.

BACKGROUND OF THE INVENTION

1. Field of the Invention

The present invention relates to computers and computer networks. More particularly, the invention relates to profiling Internet traffic flows to identify network applications responsible for the traffic flows.

2. Background of the Related Art

The evolution of the Internet in the last few years has been characterized by dramatic changes to the way users behave, interact and utilize the network. When coupled with the explosion of new applications sitting on the wire and the rising number of political, economic, and legal struggles over appropriate use of network bandwidth, it is easy to understand why now, more than ever, network operators are eager to posses a more precise and broader-in-scope information on which network applications are using their networks. The commercial world answered to this growing demand providing high-speed packet inspection appliances able to process up to 40 Gbps (gigabits per second) of traffic and supporting hundreds of packet content signatures. Still they appear to struggle in keeping up with the exponential rate at which new applications appear in the network. As a result, the attention of the research community has diverted to flow-based behavioral analysis techniques by applying sophisticated data mining algorithms that work on traffic flows (i.e., ignore packet content) to extract and analyze hidden properties of the traffic either in the forms of "social interaction" of hosts engaged in the communication or in the forms of "spatial-temporal analysis" of features such as flow duration, number and size of packets per flow, inter-packet arrival time. Apart from problems such as false positive and false negatives, these techniques are principally aimed at classifying a traffic flow with a broader application class (e.g., "P2P" (peer-to-peer) application class) rather than revealing the specific application (e.g., "P2P-KaZaA" of the many applications in the P2P application class) responsible for the traffic flow.

The demand for bandwidth management tools that optimize network performance and provide quality-of-service guarantees has increased substantially in recent years, in part, due to the phenomenal growth of bandwidth-hungry P2P applications. It is, therefore, not surprising that many network operators are interested in tools to manage traffic such that traffic critical to business or traffic with real-time constraints is given higher priority service on their network. Furthermore, security is becoming a challenge. Networks and institutions of any size are constantly being targeted with more and more sophisticated attacks. Critical for the success of any such tool is its ability to accurately, and in real-time, identify and categorize each network flow by the application responsible for the flow. Identifying network traffic using port numbers and protocol (e.g., layer-four protocols, such as TCP, UDP, etc.) was the norm in the recent past. This approach was successful because many traditional applications (e.g., layer-seven applications, such as HTTP, SMTP, etc.) use port numbers (e.g., port 80, port 25, etc.) assigned by or registered with the Internet Assigned Numbers Authority (IANA). For example, this technique labels all traffic on TCP port 80 to be HTTP traffic, all traffic on TCP port 25 to be SMTP, and so on. This approach is extremely simple to implement and introduces very little overhead on the classifier. The accuracy of this approach, however, has been seriously reduced because of the evolution of applications that do not communicate on standardized ports. Many current generation P2P applications use ephemeral ports, and in some cases, use ports of well-known services such as Web and FTP to make them indistinguishable to the port-based classifier. For example, BitTorrent® (a registered trademark of BitTorrent, Inc., San Francisco, Calif.) can run on TCP port 80 if all the other ports are blocked. In addition, applications can use or abuse random ports for communication. For example, BitTorrent® can communicate on any TCP or UDP network port that is configured by the user. Furthermore, applications can tunnel traffic inside other applications to prevent detection and/or for ease of implementation. For example, BitTorrent® can send all its data inside a HTTP session. These strategies at the application-level have essentially made port number based traffic classification inaccurate and hence ineffective.

To overcome these issues with port-based approach, techniques that rely on application payload have been developed. Typically, a payload content based signature is developed for a given application by reverse engineering the application/protocol. These signatures are agnostic to the application port usage and are usually accurate (i.e., low false positive and false negative rates). However, this approach faces the problem of scalability. In other words, keeping up with the number of applications that come up everyday is impractical due to the laborious manual reverse engineering process. For example, several hundred new P2P and gaming protocols have been introduced over the last several years. Reverse engineering all these applications in a timely manner requires a huge manual effort. In addition, reverse engineering these applications becomes increasingly difficult when applications use encryption to avoid detection. As a consequence, keeping a comprehensive and up-to-date list of application signatures is infeasible.

As is known to those skilled in the art, the web (or "World Wide Web") is a system of interlinked hypertext documents (i.e., web pages) accessed via the Internet using URLs (i.e., Universal Resource Locators) and IP-addresses. The Internet is composed of machines (e.g., computers or other devices with Internet access) associated with IP-addresses for identifying and communicating with each other on the Internet. The Internet, URL, and IP-addresses are well known to those skilled in the art. The machines composing the Internet are called endpoints on the Internet. Internet endpoints may act as a server, a client, or a peer in the communication activity on the Internet. The endpoints may also be referred to as hosts (e.g., network hosts or Internet hosts) that host information as well as client and/or server software. Network nodes such as modems, printers, routers, and switches may not be considered as hosts. In vast majority of scenarios, information about servers such as the IP-address is publicly available for user to access. In peer-to-peer based communication, in which all endpoints can act both as clients or servers, the association between an end point and the P2P application becomes publicly visible. Even in the classical client-server communication scenario, information about clients such as website user access logs, forums, proxy logs, etc. also stay publicly available. Given that many forms of communication and various endpoint behaviors do get captured and archived, enormous amount of information valuable for profiling or characterizing endpoint behavior at a global scale is publicly available but has not been systematically utilized for such purpose.

SUMMARY

Generally, embodiments of the invention provide a system and method to develop accurate payload content based signatures without manual intervention for individual application (or application layer protocols) such that they can be used for real-time classification of flows. The architecture described herein decouples the real-time traffic classifier from the offline signature generation algorithms executed in an offline training phase. All the flows that are not labeled by the real-time classifier are grouped together as a flow-set based on (port number, transport protocol) pair and sent to the signature generation module, which uses offline signature generation algorithms during an offline training phase with no real-time performance constraint for extracting application signatures.

In one or more embodiments of the invention, the application signature is based on both the longest common substrings (referred to as signature terms) and the ordering of these signature terms in the flow payload. The ordered signature terms in multiple flows within a training set is represented as a state machine where the total number of states is minimized while ensuring that incoming flows can be identified in a real-time manner using the state machine.

In general, in one aspect, the present invention relates to a method for profiling network traffic of a network. The method includes (1) obtaining, from the network traffic, a plurality of flows associated with a plurality of servers executing one or more network applications in the network, wherein a five tuple comprising a source IP-address, a destination IP-address, a source port, a destination port, and a transport protocol is same for each of a plurality of packets in a first flow of the plurality of flows, (2) identifying, using a processor of a computer system, a training set from the plurality of flows by (i) determining that a pair comprising a port number and the transport protocol is same for each of the plurality of flows, (ii) determining a number of servers for the plurality of servers as exceeding a pre-determined server diversity threshold, (iii) determining a number of flows for the plurality of flows as exceeding a pre-determined training set size threshold, and (iv) determining a statistical deviation in contributions of each of the plurality of servers to the plurality of flows as being less than a pre-determined server contribution deviation threshold, wherein the training set comprises a plurality of captured payloads corresponding to the plurality of flows, (3) identifying, from the one or more network applications based on a pre-determined criterion, a unique network application associated with the port number and the transport protocol, wherein a portion of the plurality of flows associated with at least a first server of the plurality of servers is generated responsive to at least the first server executing the unique network application, (4) determining, using the processor and from the training set, a first signature term of the network application based on a first pre-determined algorithm, and (5) determining, using the processor, a second server in the network as executing the unique network application by analyzing, based on at least the first signature term, a second flow associated with the second server.

In general, in one aspect, the present invention relates to a computer readable medium storing instructions, when executed by the computer to profile network traffic of a network, the instructions include functionality for (1) obtaining, from the network traffic, a plurality of flows associated with a plurality of servers executing one or more network applications in the network, wherein a five tuple comprising a source IP-address, a destination IP-address, a source port, a destination port, and a transport protocol is same for each of a plurality of packets in a first flow of the plurality of flows, (2) identifying a training set from the plurality of flows by (i) determining that a pair comprising a port number and the transport protocol is same for each of the plurality of flows, (ii) determining a number of servers for the plurality of servers as exceeding a pre-determined server diversity threshold, (iii) determining a number of flows for the plurality of flows as exceeding a pre-determined training set size threshold, and (iv) determining a statistical deviation in contributions of each of the plurality of servers to the plurality of flows as being less than a pre-determined server contribution deviation threshold, wherein the training set comprises a plurality of captured payloads corresponding to the plurality of flows, (3) identifying, from the one or more network applications based on a pre-determined criterion, a unique network application associated with the port number and the transport protocol, wherein a portion of the plurality of flows associated with at least a first server of the plurality of servers is generated responsive to at least the first server executing the unique network application, (4) determining, from the training set, a first signature term of the network application based on a first pre-determined algorithm, and (5) determining a second server in the network as executing the unique network application by analyzing, based on at least the first signature term, a second flow associated with the second server.

In general, in one aspect, the present invention relates to a system for profiling network traffic of a network. The system includes (1) a data collector configured to obtain, from the network traffic, a plurality of flows associated with a plurality of servers executing one or more network applications in the network, wherein a five tuple comprising a source IP-address, a destination IP-address, a source port, a destination port, and a transport protocol is same for each of a plurality of packets in a first flow of the plurality of flows, (2) a statistical analyzer configured to identify a training set from the plurality of flows by (i) determining that a pair comprising a port number and the transport protocol is same for each of the plurality of flows, (ii) determining a number of servers for the plurality of servers as exceeding a pre-determined server diversity threshold, (iii) determining a number of flows for the plurality of flows as exceeding a pre-determined training set size threshold, and (iv) determining a statistical deviation in contributions of each of the plurality of servers to the plurality of flows as being less than a pre-determined server contribution deviation threshold, wherein the training set comprises a plurality of captured payloads corresponding to the plurality of flows, (3) a signature generator configured to determine, from the training set, a first signature term based on a first pre-determined algorithm, and (4) a processor and memory storing instructions when executed by the processor comprising functionalities to (v) identify, from the one or more network applications based on a pre-determined criterion, a unique network application associated with the port number and the transport protocol, wherein a portion of the plurality of flows associated with at least a first server of the plurality of servers is generated responsive to at least the first server executing the unique network application, and (vi) determine a second server in the network as executing the unique network application by analyzing, based on at least the first signature term, a second flow associated with the second server.

Other aspects and advantages of the invention will be apparent from the following description and the appended claims.

DETAILED DESCRIPTION

Figure 1:
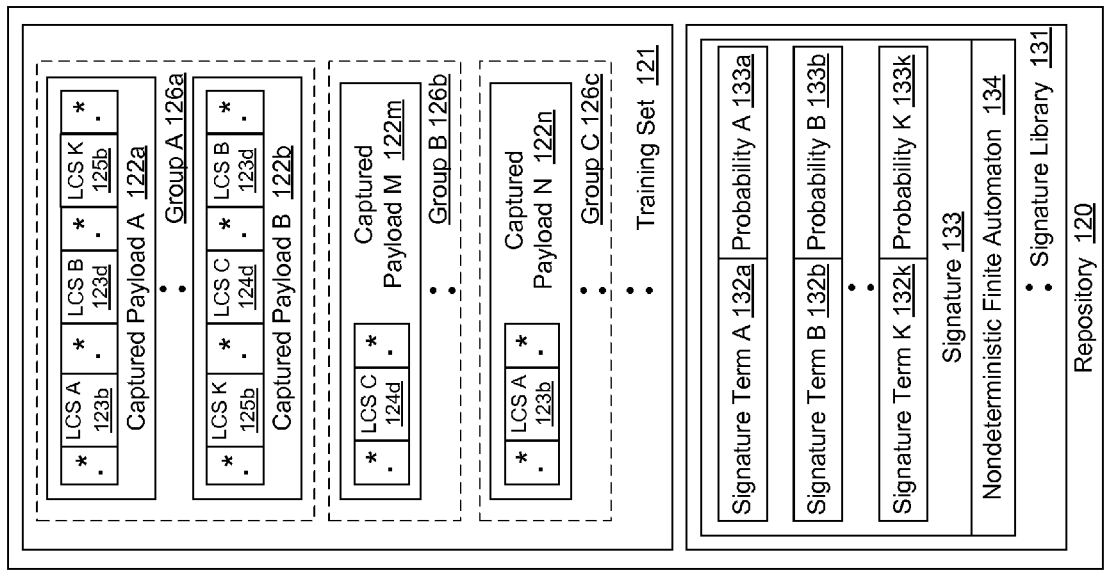
FIG. 1 shows a system block diagram according to aspects of the invention.
Figure 1:
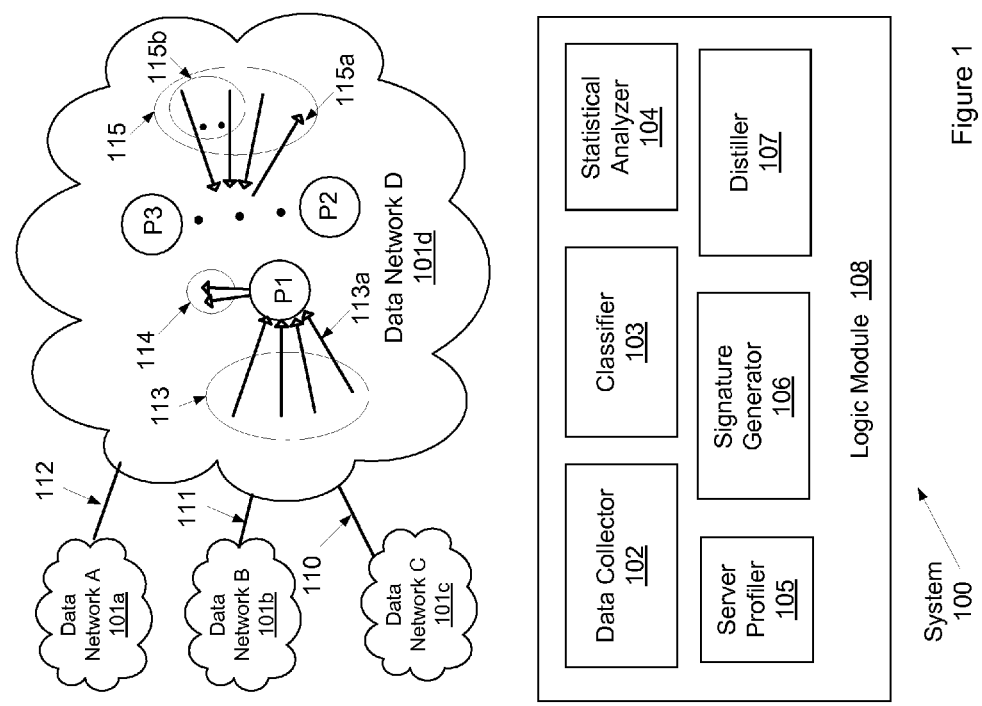

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Generally, a flow (or traffic stream) between two network hosts is a series of data records (referred to as packets or data packets) regarding the communication between the two network hosts engaged in an Internet transaction. The Internet transaction may be related to completing a task, which may be legitimate or malicious. Each packet includes a block of data (i.e., actual packet content referred to as payload) and supplemental data (referred to as header) containing information regarding the payload. Each flow is referred to as attached to each of the two hosts and is uniquely defined by a 5-tuple identifier (i.e., source address, destination address, source port, destination port, and transport protocol). Specifically, each packet in a flow includes, in its header, the 5-tuple identifier of the flow. Throughout this disclosure, the terms "traffic flow", "flow", "traffic stream" and "stream" are used interchangeably and may refer to a complete flow or any portion thereof depending on the context unless explicitly stated otherwise.

Further, the term "transport protocol" refers to a protocol associated with or based on top of a transport layer of a computer network. For example, the transport protocol may be referred to as layer-four protocol with respect to the OSI model (i.e., Open Systems Interconnection Reference Model of the network architecture). Examples of layer-four protocols include TCP, UDP, etc.

Further still, the term "application" or "network application" refers to an application associated with or based on top of an application layer of a computer network while the term "signature" or "packet content signature" refers to an application layer packet content based signature. For example, the network application may be referred to as layer-seven application with respect to the OSI model. Examples of layer-seven applications includes HTTP (HyperText Transfer Protocol), SMTP (Simple Mail Transfer Protocol), IRC (Internet relay chat), FTP (File Transfer Protocol), BitTorrent®, GTALK® (a registered trademark of Google, Inc., Mountain View, Calif.), MSN® (a registered trademark of Microsoft Corporation, Redmond, Wash., etc.). Layer-seven applications may also be referred to as layer-seven protocols.

Packet capture is the act of capturing data packets crossing a network. Partial packet capture may be performed to record headers without recording the total content of corresponding payloads. Deep packet capture may be performed to capture complete network packets including each packet header and complete packet payload. Once packets in a flow, or a portion thereof, are captured and stored, deep packet inspection may be performed to review network packet data, perform forensics analysis to uncover the root cause of network problems, identify security threats, and ensure data communications and network usage complies with outlined policy. Throughout this disclosure, a complete network packet including packet header and complete packet payload may be referred to as a full payload packet while the complete packet payload may be referred to as a full packet payload. The term "payload" may refer to full packet payload, partial packet payload, a collection of full/partial packet payloads within a flow or a portion thereof, in an interchangeable manner depending on the context unless explicitly stated otherwise.

In one or more embodiments of the invention, when full payload packets of input flows are received, a real-time classifier first reconstructs flows and then makes an attempt to label these flows using any existing packet content based signatures. If the classifier successfully labels a flow, then the result is recorded in a database. The classification process for the flow ends. However, if the classifier cannot label the flow, then the flow is sent to a packet content signature generation process. Also, the classifier sends the server IP-address used in the flow to a server profiler. The main task of the server profiler is to find the application/protocol associated with the IP-address. Based on the flow(s) from the classifier and application/protocol name from the server profiler, a statistical analyzer first forms a cohesive flow-set by grouping the flows received from the classifier that share same characteristics (e.g., common (port number, transport protocol) pair), and a signature generator subsequently extracts a set of signature terms to form a signature for the flow-set. In one or more embodiments, the signature generator is aware of only one flow-set being processed and is unaware of the existence of other flow-sets. In such embodiments, the signature generator does not have a global view of all existing signatures and flow-sets. Instead, a distiller receives any new signature generated by the signature generator and examines it along with all the other signatures that already exist in a signature library to check for conflicts and determine a quality metric for each of the extracted signatures based on a global view of all the existing signatures.

Based on the architecture described above and the reason described below, a false-negative (a flow failed to be labeled even though a signature exists in the signature library for the application associated with the flow) may be more tolerable than a false-positive (a flow that are misclassified). Specifically, the signatures for applications are generated to populate the signature library incrementally as flows generated by these applications are analyzed. Initially, there are no signatures in the signature library. When the first set of application flows are analyzed, a new signature for a particular application is generated and accordingly the signature library has one signature for the particular application. Henceforth all the flows that belong to the application (i.e., generated to execute the application) are classified and thus do not enter the offline training phase. Now, if the signature is not very accurate, then several flows that do not belong to the application may get misclassified as belonging to the application. These misclassified flows (i.e. false-positives) will never be available for subsequent training (i.e., signature generation) thus false-positive errors of the real-time classifier continue to occur. In contrast, those flows that are not classified due to false negatives are sent to the signature generator and used to generate another signature later on when sufficient number of flows is grouped into a cohesive flow-set. Accordingly, false-negative errors of the real-time classifier may be reduced as time goes on.

FIG. 1 shows a system block diagram of a system (100) in accordance with one or more embodiments of the invention. Those skilled in the art, having the benefit of this detailed description, will appreciate the components shown in FIG. 1 may differ among embodiments of the invention, and that one or more of the components may be optional. Although specific numbers of components are shown in FIG. 1, different number of each component may be included. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

A shown in FIG. 1, the system (100) includes data networks A through D (101a, 101b, 101c, 101d), a logic module (108), and a repository (120). Each of these networks A through D may be a portion of a larger network and are shown to be coupled via links (110, 111, 112). The network D (101d) includes hosts (P1, P2, P3, etc.). As shown, host (P1) is a source or destination associated with flows (113, 114) while hosts (P2, P3, etc.) are source(s) or destination(s) associated with flows (115). Accordingly, the flows (113, 114) are referred to as attached to the server (P1) while the flows (115) are referred to as attached to the servers (P2, P3, etc.). In particular, the flows (113) include a particular flow (113a) while the flows (115) include another particular flow (115a). Further, a portion of the flows (115) is a set of unidirectional flows (115b). Each flow (e.g., flow (113a), flow (115a)) in these flows (113, 114, 115) includes full payload packets. In one or more embodiments of the invention, each flow in these flows (113, 114, 115) relates to an application executing on the attached server at a particular time. For example, flows (113) may include HTTP GET commands sent from various clients to the server (P1) while the flows (114) may include HTTP TRACE commands sent from the server (P1) to various clients. Accordingly, the flows (113, 114) are referred to as "associated with an application executing on server (P1)", "corresponding to an application executing on server (P1), "generated by an application executing on server (P1)", "generated to execute an application on server (P1)", or "generated for executing an application on server (P1)" in an interchangeable manner depending on the context unless explicitly stated otherwise.

As shown in FIG. 1, the logic module (108) includes a data collector (102), a classifier (103), a statistical analyzer (104), a server profiler (105), a signature generator (106), and a distiller (107). The data collector (102), the classifier (103), and the statistical analyzer (104) may be referred to as a stream processor or a flow processor.

Further as shown in FIG. 1, the repository (120) includes a training set (121) and a signature library (131). The training set (121) is shown to include a number of captured payloads A through N (122a, 122b, 122n, etc.) each including a sequence of packet payloads captured from one flow (e.g., a flow in the flows (115)). In one or more embodiments, such sequence of packet payloads is captured from a portion (e.g., up to the first 50 packets or the first 1000 payload bytes) of such one flow. In one or more embodiments, a packet payload in such sequence of packet payloads is a full packet payload, or a portion thereof, in one packet of the flow. In particular, the sequence of packet payloads included in a captured payload (e.g., captured payload A (122a)) consists of packet payloads extracted from multiple packets and concatenated according to an order based on sequence information contained in corresponding packet headers. In one or more embodiments, packet headers (not shown), or information derived therefrom, may also be included in the training set (121) where each packet header, or information derived therefrom, is linked to a corresponding captured payload or a packet payload contained therein. In one or more embodiments, the training set (121) is extracted from a collected flow-set (not shown) and separately stored in the repository (120). In one or more embodiments, the training set (121) is embedded in a collected flow-set (not shown) that is stored in the repository (120). In such embodiments, the captured payloads (e.g., captured payload A (122a)) are extracted from the flow-set as needed during processing for signature extraction. In one or more embodiments, a captured payload (e.g., captured payload A (122a)) is extracted in real time as a flow is obtained. In such embodiments, such captured payload is stored in the repository (120) to form the training set (121) without storing a separate flow-set in the repository (120).

The signature library (131) is shown to include one or more signatures (e.g., signature (133)) each associated with a non-deterministic finite automaton (NFA) (e.g., NFA (134)) representing the associated signature. As shown, the signature (133) includes signature terms A through K (132a, 132b, 123k, etc.) corresponding to probabilities A through K (133a, 133b, 133k, etc.). Further, the signature (133) is represented by the NFA (134). In one or more embodiments, the signature library (131) may be implemented as a database, a file, a linked list, or any other suitable data structures.

In one or more embodiments, the data collector (102) is configured to obtain, from the network traffic (e.g., including all of flows (113), flows (114), flows (115), etc.), a flow-set (i.e., a set of flows, such as one or flows (113), flows (114), flows (115), flows (115b), etc.) associated with a number of servers (e.g., server (P1), server (P2), server (P3), etc.) executing one or more network applications in the network. Specifically, the data collector (102) may observe and collect, for example from links (110, 111, 112), information regarding network traffic when available and to filter and organize the collected traffic data regarding duplicate records or out-of-order records. Accordingly, the collected traffic data is reconstructed to represent data packets of a flow in an appropriated order (e.g., based on sequence information in the headers) consistent with the Internet transaction performed by the flow. Throughout this disclosure, "obtaining a flow" may refer to obtaining a complete flow or any portion thereof depending on the context unless explicitly stated otherwise.

In one or more embodiments, the output of the data collector (102) includes a captured payload (e.g., captured payload A (122a), etc.) of a flow (e.g., flow (113a), flow (115a)) and is provided to the classifier (103) configured to either identify an application (e.g., HTTP) (e.g., associated with the flow (113a)) or to pass information (e.g., a captured payload or a reference thereof) of a not-yet-identifiable flow (e.g., flow (115a)) to the statistical analyzer (104). In particular, the captured payloads (e.g., captured payload A (122a), etc.), when included in the training set (121), are already processed by the data collector (102) regarding duplicate records or out-of-order records based on corresponding packet headers.

In one or more embodiments, the classifier (103) is configured to classify the flows collected and processed by the data collector (102) in real time using a list of known signatures (e.g., signature (133)) in the signature library (131), which are previously extracted/generated by the signature generator (106). For example, concurrently with a portion of a flow being generated in response to the attached server executing a network application to complete a task (e.g., by performing an Internet transaction), data packets in the portion of the flow are processed by the classifier (103) in an expedient manner to identify the particular network application prior to the task or the flow being completed by the attached server. Every flow received from data collector (102) for which a signature is available is classified (i.e., associated with an application) and promptly reported to the end-user (not shown). Accordingly, an alert may be generated in time to block a malicious flow aimed at performing a malicious Internet transaction or other malicious task.

In one or more embodiments, when an unknown flow (i.e., flow (115a) for which a signature is not yet available in the signature library (131)) is observed, the classifier (103) forwards the unknown flow, or related information thereof, to the statistical analyzer (104) to be added to a training set (121) for generating a new signature subsequently. In one or more embodiments, the flow (115a), or related information thereof, may be sent from the data collector (102) to the statistical analyzer (104) directly bypassing the classifier (103), for example when there is no signature in the signature library (131) initially.

In one or more embodiments, the statistical analyzer (104) is configured to identify the training set (121) from a set of flows (i.e., a flow-set, such as the set of unidirectional flows (115b)), or captured payloads thereof, by (i) determining that the port number and the transport protocol is same for each flow in the flow-set, (ii) determining a number of servers attached to flows in the flow-set as exceeding a pre-determined server diversity threshold, (iii) determining a number of flows in the flow-set as exceeding a pre-determined training set size threshold, and (iv) determining a statistical deviation in contributions of each server to the flow-set as being less than a pre-determined server contribution deviation threshold. Said in other words, the training set (121) must be based on sufficient number (i.e., exceeding the pre-determined training set size threshold) of flows contributed sufficiently equally without individual domination(s) (i.e., based on the pre-determined server contribution deviation threshold) from a sufficiently large number (i.e., exceeding the pre-determined server diversity threshold) of servers where each flow contributing to the training set (121) must have the same port number and transport protocol. As an example, the pre-determined training set size threshold may be 5,000 flows, the pre-determined server contribution deviation threshold may be, depending on specific format thereof, 100 flows, two standard deviations, or 20%, and the pre-determined server diversity threshold may be 50 servers. As noted above, the training set (121) may include the captured payloads and other relevant portion of the identified flow-set.

In one or more embodiments, the aforementioned same port number (e.g., port 80) corresponds to the source port of each flow in the flow-set. In such embodiments, each flow in the flow-set is a unidirectional flow with the source IP-address being associated with a server executing a unique network application. In particular, each flow in the flow-set is sent from the server to a client to execute the unique network application.

In one or more embodiments, the aforementioned same port number (e.g., port 80) corresponds to the destination port of each flow in the flow-set. In such embodiments, each flow in the flow-set is a unidirectional flow with the destination IP-address being associated with a server executing a unique network application. In particular, each flow in the flow-set is sent from a client to the server to execute the unique network application.

In one or more embodiments, the statistical deviation in contributions of each server to the flow-set is controlled to be less than the pre-determined server contribution deviation threshold by controlling the maximum number of flows each server can contribute into the flow-set. In such embodiments, the pre-determined server contribution deviation threshold may be specified as a pre-determined maximum number of flows. For example, once the flow-set contains the pre-determined maximum number (e.g., 100) of flows attached to a particular server when the statistical analyzer (104) is building the training set (121), any additional flow (e.g., any flow obtained subsequent to the first 100 flows) sent to the statistical analyzer (104) that is attached to this particular server is discarded by the statistical analyzer (104). In such manner, no single server can have a contribution that dominates the flow-set.

In one or more embodiments, the statistical deviation in contributions of each server to the flow-set is controlled to be less than the pre-determined server contribution deviation threshold by tallying the number of flows contributed from each server to generate a statistical distribution (e.g., a histogram of contributed flow count per server) associated with a standard deviation $\sigma$. In such embodiments, the pre-determined server contribution deviation threshold may be specified as a range centering the peak of the statistical distribution. For example, the range may be expressed as a fraction or a multiple of the standard deviation $\sigma$ (e.g., $0.5\sigma$, $\sigma$, $2\sigma$, etc.) or as a percentage of the contributed flow count at the peak of the statistical distribution (e.g., 20%). Accordingly, any server and flow associated with the portion of the statistical distribution outside of the pre-determined server contribution deviation threshold defined range are discarded to prune the flow-set for meeting the pre-determined server contribution deviation threshold requirement. Alternatively, any new flow associated with a server already within the pre-determined server contribution deviation threshold defined range are discarded to allow other servers not yet in the range to catch up in their contributed flow counts while expanding the flow-set for meeting the pre-determined server contribution deviation threshold requirement.

In one or more embodiments, the signature generator (106) is configured to determine a signature term (e.g., signature term A (132a)) based on the training set (121) by (i) dividing the training set (121) into groups (ii) identifying one or more longest common substring of any two or more captured payloads within each group using a pre-determined algorithm, and (iii) determining the longest common substring as the signature term based on a probability of occurrence of the longest common substring in the training set (121) exceeding a pre-determined noise threshold. In one or more embodiments, the divided groups are non-overlapping groups. Generally, the training set (121) may be divided into any number (e.g., 100) of multiple groups. In the example shown in FIG. 1, the training set (121) is divided into more than three groups.

As shown in FIG. 1, the training set (121) is divided into group A (126a), group B (126b), group C (126c), and other group(s) not specifically shown. For example, group A (126a) includes the captured payload A (122a) and the captured payload B (122b) among others while the captured payload M (122m) and captured payload N (122n) are included in group B (126b) and group C (126c), respectively. Generally, a group (e.g., group A (126a), group B (126b), etc.) includes at least two flows in the flow-set, however, exceptions may also occur.

In one or more embodiments, a captured payload (e.g., captured payload A (122a)) in the training set (121) is considered as a string (e.g., of data bytes or characters from multiple packets corresponding to the captured payload). The longest common substring is the longest substring that is common to (i.e., exists simultaneously in) two or more such strings. For example, the longest common substrings of the strings "ABAB", "BABA" and "ABBA" are the strings "AB" and "BA" of length 2. Other common substrings are "A" and "B", which are not longest common substring as they are shorter in length.

As shown in FIG. 1, the captured payload A (122a) includes three substrings LCS A (123b), LCS B (123d), and LCS K (125b) interposed in wildcard substrings (.*). The captured payload B (122b) includes three substrings LCS K (125b), LCS C (124d), and LCS B (123d) interposed in wildcard substrings (.*). The captured payload M (122m) includes a substring LCS C (124d) interposed in wildcard substrings (.*). The captured payload N (122n) includes a substring LCS A (123b) interposed in wildcard substrings (.*). As is known to those skilled in the art, a wildcard substring (.*) contains non-pre-determined data bytes (or characters) that substitutes for other data bytes (or characters) in a regular expression, which is an expression known to those skilled in the art that describes a set of substrings in a string as an ordered sequence. For example, each of the LCS A (123b), LCS B (123d), and LCS K (125b) is a substring embedded in a captured payload represented by a regular expression as described below.

In one or more embodiments, the signature generator (106) is configured to identify one or more longest common substring for each pair of captured payloads within each group (e.g., group A (126a), group B (126b), etc.) in the training set (121) based on algorithms known to those skilled in the art. For example, LCS B (123d) and LCS K (125b) are the longest common substrings for the pair (captured payload A (122a), captured payload B (122b)) within the group A (126a), LCS C (124d) is the longest common substring for the pair (captured payload M (122m), captured payload X (not shown)) within the group B (126b), LCS A (123b) is the longest common substring for the pair (captured payload N (122n), captured payload Y (not shown)) within the group C (126c). Other longest common substrings identified for other pairs are not specifically shown in the training set (121) for clarity. In an example where group A (126a) has 50 captured payloads, longest common substrings are identified from each of 1225 (50*49/2) pairs of captured payloads within the group A (126a). In one or more embodiments, the groups are non-overlapping and no longest common substring is identified for any captured payload pair crossing a group boundary. Generally, a captured payload always contains (by definition) the longest common substrings of a pair including the captured payload itself. In addition, the captured payload may also contain one or more longest common substrings of other pairs not including the captured payload. For example, the captured payload A (122a) contains the LCS B (123d) and LCS K (125b) that are the longest common substrings of the pair including the captured payload A (122a) itself as well as contains the LCS A (123b) that is the longest common substring of the pair within the group N (122n) and not including the captured payload A (122a).

In one or more embodiments, the signature generator (106) is configured to qualify the identified longest common substrings into signature terms. In one or more embodiments, an identified longest common substring is determined to be a signature term if its length exceeds a pre-determined length threshold and its probability of occurrence exceeds a pre-determined noise threshold. In such embodiments, the signature generator (106) is configured to calculate a probability of occurrence of each identified longest common substring by analyzing all captured payloads in the entire training set (121) and tallying the total number that each identified longest common substring occurs in the entire training set (121). For example, the probability of occurrence may be calculated as a non-normalized occurrence count (e.g., 100 times) or as a normalized percentage (e.g., 10% of total 1000 times) of total count of all identified longest common substring in the training set (121).

For example, if the pre-determined length threshold is four bytes and the pre-determined noise threshold is 100 times, an identified longest common substring has to be four bytes or longer and occurs more than 100 times in the training set (121) to be determined as a signature term. As shown, the LCS A (123b), LCS B (123d), and LCS K (125b) are determined as meeting this requirement and are stored in the signature library (131) as the signature term A (132a), signature term B (132b), and signature term K (132k), respectively. In addition, the number of times each of the LCS A (123b), LCS B (123d), and LCS K (125b) occurs in the training set (121) is also stored in the signature library (131), associated with the respective signature term, as the probability A (133a), probability B (133b), and probability K (133k), respectively. In contrast, the LCS C (124d) is determined as failing to meet the aforementioned requirement and not stored in the signature library (131). For example, LCS C (124d) may either be less than four bytes long or occurs less than the example noise threshold of 100 times in the training set (121).

In one or more embodiments, determining an identified longest common substring to be a signature term requires additional qualification based on a pre-determined criterion. More details of various qualification requirements are described in reference to FIG. 2a below.

All signatures terms determined based on the training set (121) are collectively referred to as the signature (133), which is considered to be associated with the (port number, transport protocol) pair of the training set (121). Although not specifically shown in FIG. 1, more than one training set may be identified from flow-sets with different port numbers and different transport protocols. Accordingly, more than one signature may be determined as associated with various different (port number, transport protocol) pairs and stored in the signature library (131).

In one or more embodiments, the signatures stored in each signature in the signature library (131) may be qualified using the distiller (107). For example, the distiller (107) may be configured to perform various tasks described below.

First, the distiller (107) expires signatures characterized by long inactivity time, i.e., the last time a flow was matched those signatures by the classifier (103) exceeded a pre-specified internal threshold. This task is referred to as signature-expiration process.

Second, for the remainder signatures in the signature library (131), the distiller (107) provides an indicator that reflects the overall quality of the signatures present in the signature library (131) such as to alert the situations in which distinct signatures may look similar. This second task is referred to as signature quality estimation process.

Third, distiller (107) decides whether a new signature can be appropriately added to the signature library (131) without compromising the quality of the current signatures. A set of signatures is said to be of good quality if the signatures constituting the set are dissimilar from each other based on a pre-determined similarity measure. This task is referred to as signature-specific quality estimation process.

Fourth, the distiller (107) is responsible to optimize the signature library (131) by deciding which signatures can be consolidated, i.e., appending more than one signature to the same network application. This task is referred to as signature consolidation process.

In one or more embodiments, subsequent to compiling and/or qualifying the signature library (131), the signature generator (106) is further configured to analyze each of the captured payloads in the training set (121) to identify any signature term contained therein. In addition, the signature term(s) identified in a captured payload forms an ordered sequence of signature term(s). For example in FIG. 1, the captured payload A (122a) includes the ordered sequence of <LCS A (123b), LCS B (123d), LCS K (125b)>, the captured payload B (122b) includes the ordered sequence of <LCS K (125b), LCS B (123d)>, the captured payload M (122m) does not include any ordered sequence of signature term(s), and the captured payload N (122n) includes the ordered sequence of <LCS A (123b)>. As described above, LCS C (124d) is not determined as a signature term therefore is excluded from the ordered sequence of signature terms. In the example where the training set (121) is identified from a flow-set having (80, TCP) as the (port number, transport protocol) pair, the captured payload A (122a), captured payload B (122b), and captured payload N (122n) may correspond to HTTP flows using (80, TCP) in a standard manner while the captured payload M (122m) may correspond to a BitTorren flow using (80, TCP) in a non-standard manner. More details of associating a network application to the (port number, transport protocol) pair is described later with respect to the server profiler (105).

In one or more embodiments, the signature generator (106) is further configured to represent each of the captured payloads in the training set (121) as a regular expression based on the signature terms (e.g., signature term A (132a), signature term B (132b), signature term K (132k)) contained in the signature library (131). In particular, the regular expression describes the aforementioned ordered sequence of signature terms in the captured payload. For example, the captured payload A (122a) may be represented as a regular expression based on the signature term A (132a), signature term B (132b), and signature term K (132k) corresponding to the LCS A (123b), LCS B (123d), and LCS K (125b). Similarly, the captured payload B (122b) may be represented as a regular expression based on the signature term K (132k) and signature term B (132b) corresponding to the LCS K (125b) and LCS B (123d). The captured payload N (122n) may be represented as a regular expression based on the signature term A (132a) corresponding to the LCS A (123b). Although the example here shows regular expressions based on one, two, or three signature terms, other example captured payloads (not shown) represented by regular expressions having any number of signature terms may be found in the training set (121).

In one or more embodiments, the signature generator (106) is further configured to represent the collection of regular expressions in the training set (121), which are based on signature terms in the signature (133), as a nondeterministic finite automaton (NFA) (134) and store it in the signature library (131) as associated with the signature (133). In one or more embodiments, algorithms known to those skilled in the art may be used to convert the collection of regular expressions into the NFA (134). More details of converting the collection of regular expressions into the NFA (134) are described in reference to FIGS. 3a-3g below.

In one or more embodiments, the classifier (103) is configured to match a newly received flow (e.g., flow (113a)) to the signature (133) using the NFA (134). In particular, the newly received flow is matched to the signature (133) regardless of the port number or the transport protocol of such newly received flow. The flow (113a) is said to match the signature (133) if the flow (113a) contains any regular expression in the training set (121). More details of using the NFA (134) to match the flow (113a) to the signature (133) are described in reference to FIGS. 3a-3g below. Further, an example method for using the NFA (134) to match the flow (113a) to the signature (133) in real time is described in related U.S. patent application Ser. No. 13/039,180 filed Mar. 2, 2011 and entitled "System and Method for Using Network Application Signatures Based On Term Transition State Machine," which is incorporated herein by reference.

Associating a network application to the (port number, transport protocol) pair, and therefore associating the network application to the signature of the (port number, transport protocol) pair, is described below. Accordingly, in response to matching the newly received flow (e.g., flow (113a) to the signature (133), the newly received flow is labeled with the network application associated with the signature (133) and, therefore, a server (e.g., server (P1) attached to the newly received flow (e.g., flow (113a) is determined as executing the network application associated with the signature (133).

In one or more embodiments, the server profiler (105) is configured to identify, from one or more network applications based on a pre-determined criterion, a unique network application associated with the (port number, transport protocol) pair. As described above, the signature (133) is determined based on a training set identified from sufficient number of flows, all having the same (port number, transport protocol) pair, contributed sufficiently equally from a sufficiently large number of servers. Empirically, majority of such servers would be executing the same network application (referred to as the main network application or the unique network application) associated with the (port number, transport protocol) pair based on a common practice. Specifically, the pre-determined criterion employed by the server profiler (105) is based on the premise that the number of servers executing other network applications based on non-common practice of using the (port number, transport protocol) pair is in the minority when the total number of servers is sufficiently large contributing sufficiently equally to sufficiently large number of flows in the flow-set.

In one or more embodiments, each server contributing to the training set (121) is tagged with a network application. For example, such network application may be tagged based on the Internet Assigned Numbers Authority (IANA) standard. Another example method for tagging a server with a network application is described in U.S. patent application Ser. No. 12/104,723 filed Apr. 17, 2008 and entitled "System and Method for Internet Endpoint Profiling," which is incorporated herein by reference. In one or more embodiments, the server profiler (105) tallies the number of servers executing each of the tagged network applications to identify the network application executing on a maximum number of servers in the tallied result as the main (or unique) network application associated with the (port number, transport protocol) pair.

Figure 2A:
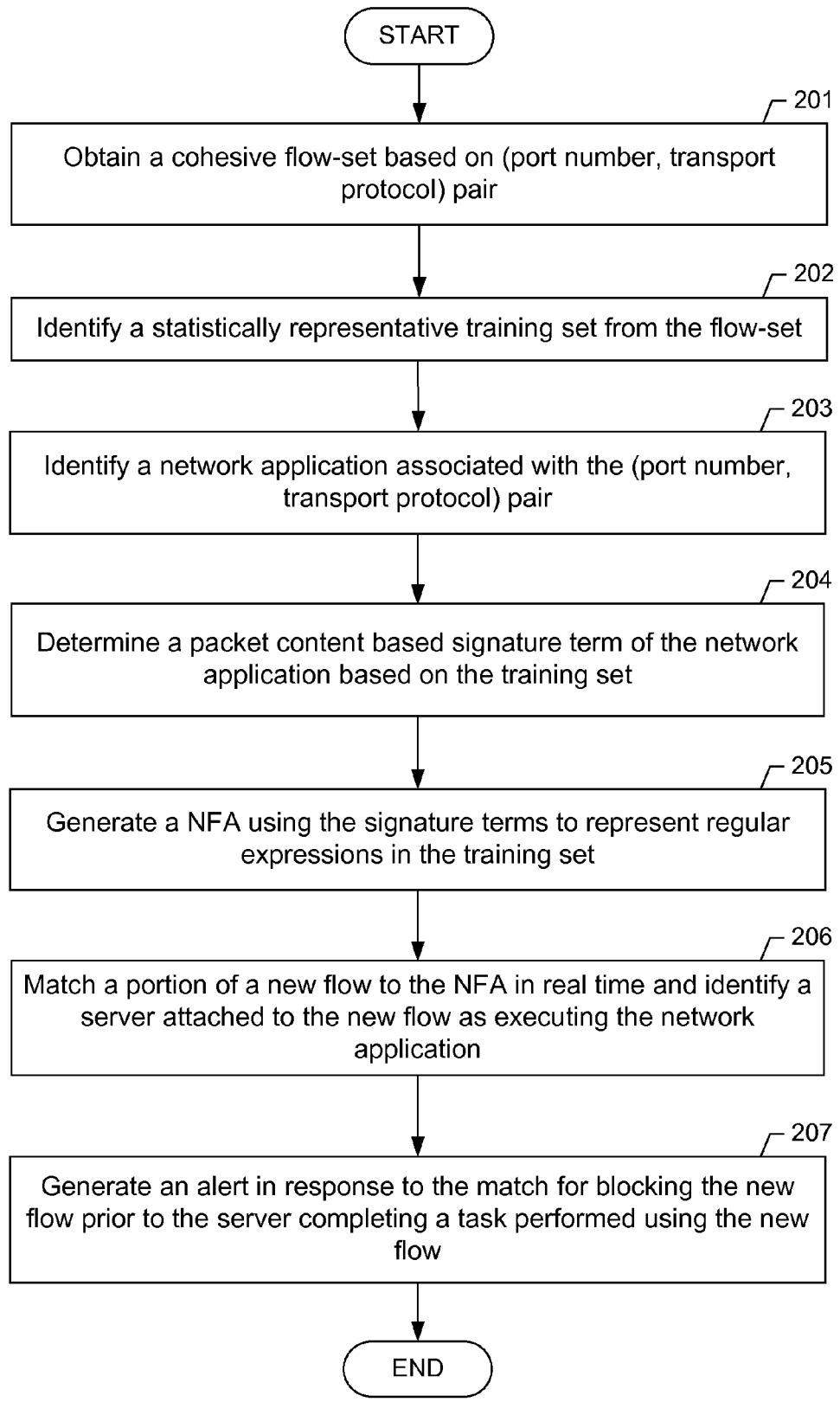
FIGS. 2a and 2b show flowcharts of a method according to aspects of the invention.
Figure 2B:
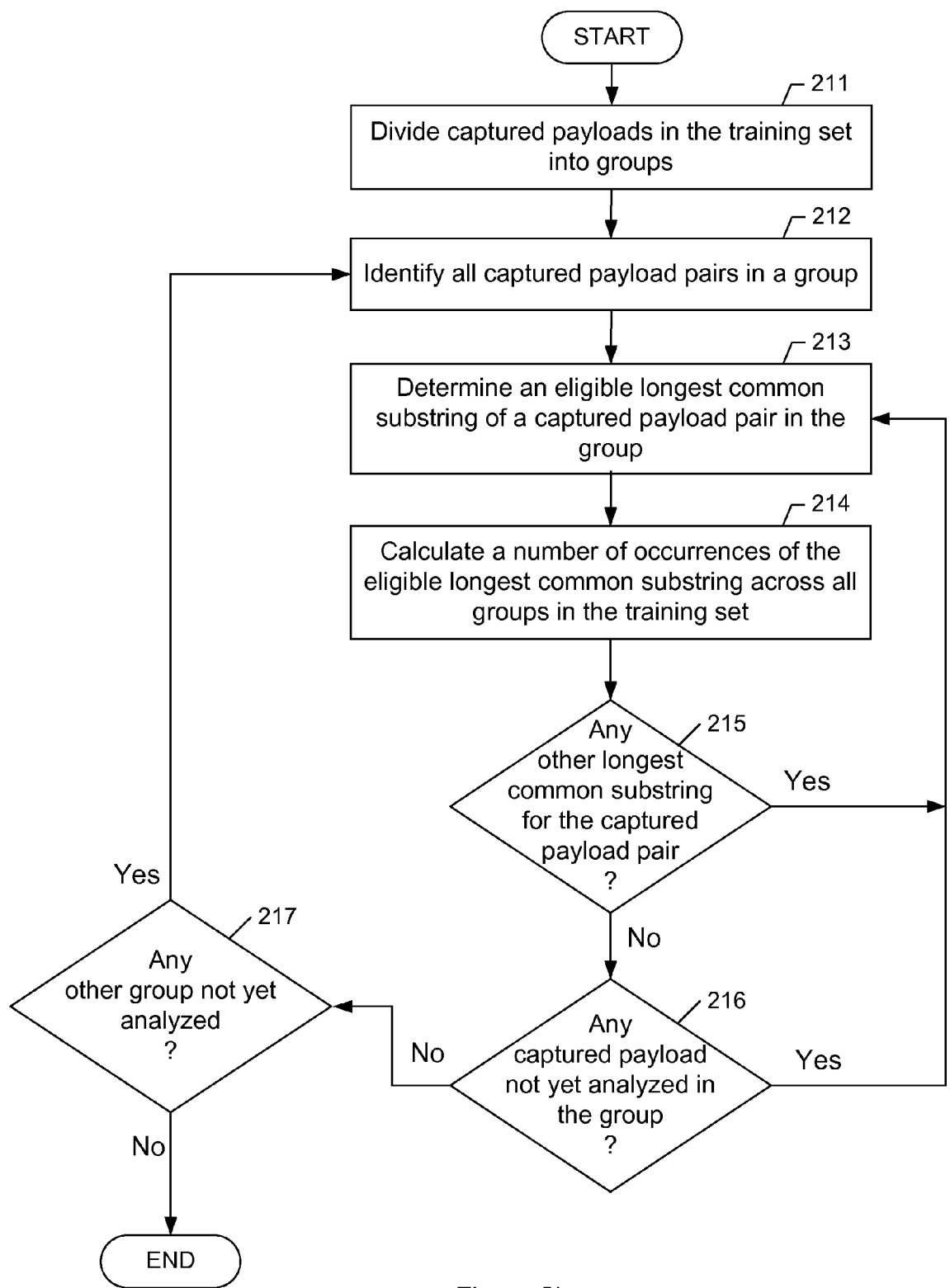

FIGS. 2a and 2b depict a flowchart of a method in accordance with one or more embodiments of the invention. In one or more embodiments of the invention, one or more of the steps shown in FIGS. 2a and 2b may be omitted, repeated, and/or performed in a different order. Accordingly, embodiments of the invention should not be considered limited to the specific arrangements of steps shown in FIGS. 2a and 2b. In one or more embodiments of the invention, the method depicted in FIGS. 2a and 2b may be practiced using system (100) described with respect to FIG. 1 above.

In particular, the method depicted in FIGS. 2a and 2b automatically extracts payload content based signatures using the flow payloads in the incoming flow-sets. Specifically, the most frequently occurring terms are extracted from the flows identified by a unique (port number, transport protocol) pair. Further, these terms are used to automatically build a state machine, which is used as the application signature.

Initially in Step 201, a cohesive flow-set (i.e., a cohesive set of flows) is obtained based on a (port number, transport protocol) pair. Generally, a set of flows obtained from the network traffic is associated with a number of servers executing one or more network applications in the network. To specify each flow, a five tuple of (source IP-address, destination IP-address, source port, destination port, transport protocol) is used, which contains the same five elements for each and all packets making up a flow. In one or more embodiments of the invention, the obtained flow-set is maintained as a cohesive set of flows by requiring the (port number, transport protocol) pair in the five tuples to be the same (i.e., cohesive) among all flows in the flow-set. Throughout this disclosure, the terms "flow-set", "a set of flows", "cohesive flow-set", and "a cohesive set of flows" may be used interchangeably depending on the context unless explicitly stated otherwise. Further, the term "flow" may refer to a complete flow or a portion thereof unless explicitly stated otherwise.

In one or more embodiments, the port number of the cohesive (port number, transport protocol) pair corresponds to the source port (as in a five tuple) for each flow in the flow-set. In such embodiments, the flows in the flow-set are unidirectional flows sent to respective clients from the cohesive source ports (i.e., having the same source port number) of various servers contributing to the flow-set. These various servers are identified by the source IP-addresses (as in respective five tuples) of the flows in the flow-set. Said in other words, the server IP-addresses of the flow-set are the source IP-addresses of the flows in such flow-set.

In one or more embodiments, the port number of the cohesive (port number, transport protocol) pair corresponds to the destination port (as in a five tuple) for each flow in the flow-set. In such embodiments, the flows in the flow-set are unidirectional flows received from respective clients at the cohesive destination ports (i.e., having the same destination port number) of various servers contributing to the flow-set. These various servers are identified by the destination IP-addresses (as in respective five tuples) of the flows in the flow-set. Said in other words, the server IP-addresses of the flow-set are the destination IP-addresses of the flows in such flow-set.

In one or more embodiments, the flow-set may also contain bi-directional flows. In such embodiments, the port number of the cohesive (port number, transport protocol) pair corresponds to either the source port or the destination port for the packets in the bi-directional flows. Specifically, those packets in the bi-directional flows having the cohesive port number corresponding to their source ports are sent from the cohesive source ports (i.e., having the same source port number) of various servers, identified by the source IP-addresses of the packets, to their clients. Said in other words, the server IP-addresses of the flow-set include the source IP-addresses of these packets.

Similarly, other packets in the bi-directional flows having the cohesive port number corresponding to their destination ports are received at the cohesive destination ports (i.e., having the same destination port number) of various servers, identified by the source IP-address of the packet, to their clients. Said in other words, the server IP-addresses of the flow-set also include the destination IP-addresses of these other packets.

In one or more embodiments, the flow-set includes multiple portions each may be a set of unidirectional flows with cohesive source ports, a set of unidirectional flows with cohesive destination ports, or a set of bi-directional flows having some packets with cohesive source ports and other packets with cohesive destination ports. The flow-set is maintained as a cohesive set of flows by requiring the cohesive source ports and the cohesive destination ports of all portions in the flow-set to have the same port number as well as requiring the transport protocol of all flows in the flow-set to be the same.

The cohesive set of flows described above typically represents results of the aforementioned servers executing a single network application (e.g., a layer seven application/protocol). However, it is empirically observed that a few flows, referred to as "noise", from executing other applications/protocols may infiltrate the cohesive flow-set. Empirically, the noise in the cohesive flow-set is small compared to the other flows, referred to as legitimate flows, associated with executing the single network application (referred to as the main network application). Based on a probabilistic approach to signature extraction as described below, the impact of noise on the quality of extracted signatures is minimal. Hence the signatures extracted from the cohesive flow-set generally represent the main network application being executed to generate the majority of the flow-set.

In Step 202, a statistically representative training set is identified from the cohesive flow-set obtained in Step 201. In one or more embodiments of the invention, the training set is identified to be an appropriate statistical representation of all possible application flows resulting from executing the main network application of the cohesive flow-set. For example, a statistical representative FTP training set should contain all types of FTP flows including FTP control flows and FTP data flows. Also, the number of flows from other applications (i.e., noise) should be as small as possible. In one or more embodiments, the training set is identified by requiring the cohesive flow-set to meet the following additional criteria: (a) Server diversity criterion requiring the total number of server IP-addresses in the flow-set to be greater than a pre-determined server diversity threshold. This ensures that the extracted signature is not specific to one server, (b) server contribution deviation criterion requiring statistical deviation in contributions from each of the servers to be less than a pre-determined server contribution deviation threshold. For example, the number of flows contributed from each server IP-address is required to be upper-bounded by a pre-determined maximum number. This reduces the impact of any one server on the extracted signature, and (c) total flows per flow-set criterion requiring the total number of flows in the flow-set to be greater than a pre-determined training set size threshold. This ensures that the flow-set contains enough number of flows to represent a statistically representative subset of all possible application flows.

In one or more embodiments, flows are collected into the cohesive flow-set while the above criteria are evaluated periodically to ensure compliance. Said in other words, the cohesive flow-set meets these criteria in a correct-by-construction manner. In one or more embodiments, the cohesive flow-set is obtained based on a pre-determined (port number, transport protocol) pair prior to being evaluated and qualified by the above additional criteria. In such embodiments, the initial cohesive flow-set may be filtered or pruned to satisfy these criteria.

In one or more embodiments, packets are reordered and reassembled into un-fragmented and in-order flows in the cohesive flow-set before the training set is generated from the cohesive flow-set. For example, a queue engine may be used to store incoming packets in a packet memory controlled by a link list controller. Accordingly, a packet assembler may be used to extract information from each packets to determine if the packet header is fragmented or out-of-order. If the packets are determined to be out-of-order, the queue engine may use a reordering unit to modify links with the link list controller to reorder the packets. A fragment reassembly unit may also be used to reassemble fragments into complete un-fragmented packets. For example, the packets may be reordered and un-fragmented for the TCP protocol, which is a connection-oriented reliable protocol designed for transport over other potentially unreliable network protocols, and is designed to recover from data that is damaged, lost, duplicated, or delivered out-of-order by the underlying transport layer.

In one or more embodiments, the training set includes relevant portions of the cohesive flow-set, as re-ordered and re-constructed above. For example, packet payloads from consecutive in-order packets in a flow may be concatenated into a string, referred to as a captured payload, and included in the training set. As noted above, the packet payload may be a full packet payload or a portion thereof. The captured payload may be extracted from a portion of a flow up to a pre-determined length. The training set may also include other information (e.g., from packet headers) that are linked to corresponding captured payloads in the training set. In one or more embodiments, the training set is organized as a set of strings (i.e., captured payloads) corresponding to flows in the flow-set and embedded with metadata (e.g., extracted from packet headers) relating to information regarding these strings.

In one or more embodiments, the training set is extracted from a collected cohesive flow-set and separately stored in a data repository. In one or more embodiments, the training set is embedded in the collected cohesive flow-set that is stored in a data repository. In such embodiments, the captured payload strings are extracted from the flow-set as needed during processing for signature extraction. In one or more embodiments, a captured payload string is extracted in real time as a flow is obtained for the cohesive flow-set. In such embodiments, such captured payload string is stored in a data repository to form the training set without separately storing a flow-set in the repository.

In Step 203, a network application associated with the (port number, transport protocol) pair is identified. In one or more embodiments, each of the aforementioned servers contributing to the cohesive flow-set is tagged with a network application. For example, such network application may be tagged based on the Internet Assigned Numbers Authority (IANA) standard. Another example method for tagging a server with a network application is described in U.S. patent application Ser. No. 12/104,723 filed Apr. 17, 2008 and entitled "System and Method for Internet Endpoint Profiling," which is incorporated herein by reference. In one or more embodiments, the number of servers executing each of the tagged network applications is tallied to identify a particular network application executing on a maximum number of servers within the flow-set as the network application associated with the (port number, transport protocol) pair. Essentially, the network application associated with the (port number, transport protocol) pair is the aforementioned main network application responsible for generating a majority portion of the cohesive flow-set.

In Step 204, a packet content based signature term of the network application identified in Step 203 is determined based on the training set. In one or more embodiments of the invention, a set of signature terms are determined using a pre-determined algorithm depicted in FIG. 2b below.

The algorithm and method depicted in FIG. 2b generates an eligible set of common terms as well as probability of occurrence for each of the terms occurring in the training set. For example, each of the common terms may be common to two or more captured payloads in the training set while the probability of occurrence may be calculated as the number of occurrences for a common term normalized over the total number of occurrences of all common terms.

As shown in FIG. 2b, initially, the training set is divided into separate groups of captured payloads. In one or more embodiments, such groups are non-overlapping groups where each captured payload belongs to only one group (Step 211).

In Step 212, all captured payload pairs in a particular group are identified. For example, if the group contains 50 captured payloads, there will be 1225 (i.e., (50*49)/2) unique captured payload pairs. In Step 213, a longest common substring of two captured payloads in the pair is identified using a pre-determined algorithm, such as a pair-wise comparison algorithm known to one skilled in the art. In one or more embodiments, the identified longest common substring needs to be longer than a pre-determined length threshold (e.g., four bytes) to be considered as an eligible longest common substring. For example, any longest common substring less than four bytes long are discarded. Throughout this disclosure, the terms "longest common substring" and "eligible longest common substring" may be used interchangeably depending on the context unless explicitly stated otherwise. Although Steps 212 and 213 describe identifying longest common substrings using pair-wise analysis approach, other algorithms may also be used to identify a longest common substring by analyzing three or more captured payloads concurrently.

In Step 214, occurrences of the eligible longest common substring across all groups of captured payloads in the training set are tallied to calculate a number of occurrences of the eligible longest common substring. This will be used to calculate the probability of occurrence when all other eligible longest common substrings are also identified and tallied in the training set.

Generally, more than one longest common substring may be found in two strings. A determination is made in Step 215 as to whether additional longest common substring can be found in the pair of captured payloads. If the determination is yes, the method returns to Step 213. Otherwise, the method proceeds to Step 215 where another determination is made as to whether any other captured payload in the group is not yet analyzed for identifying eligible longest common substring(s). If the determination is yes, the method returns to Step 213. Otherwise, the method proceeds to Step 217 where yet another determination is made as to whether any other group in the training set is not yet analyzed for identifying eligible longest common substring(s). If the determination is yes, the method returns to Step 212. Otherwise, the method ends.

Returning to the discussion of Step 204 in FIG. 2a, with the set of all eligible longest common substrings in each divided group of the training set identified and tallied, those eligible longest common substrings with probability of occurrence exceeding a pre-determined noise threshold are identified as signature terms of the aforementioned (port number, transport protocol) pair. Accordingly, such signature terms are used to represent the network application associated with the (port number, transport protocol) pair, as identified in Step 203 above.

TABLE 1 depicts an example algorithm based on FIG. 2b for extracting common terms in a large number of strings. The input to this algorithm is a flow-set that not only contains the information about the server IP-addresses, but also contains the application payload content of each flow in this flow-set. Extracting common terms requires pair-wise comparisons of the application payload content of all the flows in the flow-set. In other words, if there are n flows in a flow-set, then this operation requires $O(n^2)$ payload comparisons. To further increase the complexity, each payload comparison involves all common substring extraction—an operation that has the complexity $O(ab)$, where a and b are the lengths of the two payload strings that are being compared. Hence the overall complexity of extracting all common substrings for a flow set has the complexity $O(n^2 m^2)$, where n is the total number of flows in the flow-set and m is the average length of the payload strings in the flow-set. For a flow-set consisting of a few thousand flows and the average payload length of 1000 bytes, the common substring extraction algorithm requires more than a million string comparisons, which is an impractical operation.

Hence in the algorithm depicted in TABLE 1, a given flow-set F is divided into several smaller subsets (see, algorithm line 4) where common terms are extracted in each of these subsets independently. For every pair of payloads in each of the subsets (line 5), the algorithm extracts all the common terms (line 6). However, terms that are very short will often lead to false positives in using the resultant signature to identify a network application, and hence a threshold $T_{len}$ is used as the lower bound on the length of each term to be considered as an "eligible" term (line 8). The set of eligible terms is sanitized by eliminating duplicates (line 9). The algorithm then computes the probability of every term in the eligible term set with respect to all the flows in the flow set (line 10). A second round of sanitization on the eligible term set is then performed to resolve substrings problem (line 11). In other words, if one common term is a substring of another common term, then the term that has a higher probability of occurrence is retained while the other one is eliminated. If the probabilities are the same, then the common term that is longer is retained. Finally, a confidence score for F is computed based on the number of server IP-addresses used and the number of flows considered (line 16). The confidence score is high only if the number of servers and the number of flows is high indicating that the flows in F is a statistically representative set of flows for the particular network application/protocol.

TABLE 1

```
1:    Parameters; FlowSet F;
2:    Function ECT(A,B)
3:    list = ∅
4:    ss = splitIntoSubsets(F) /*Split Flow Set into Subsets */
5:    for i,j in ss do
6:        cs = comparePayloads (i,j); /*Compare payloads to extract
              common sub-strings */
7:        for t in cs do
8:            if length(t) > T_len then
9:                eliminateDuplicates(t);
10:               p_t = computeProb(t);
11:               x = resolveSubstrings(t, p_t);
12:               insert (x, p_x, list); /* insert the term along with its
                      probability into list */
13:           end if
14:       end for
15:   end for
16:   c = computeConfidence(F);
17:   return(list, c)
```

In one or more embodiments of the invention, the signature terms generated based on the method/algorithm of FIG. 2b or based on TABLE 1 is stored in a signature library. In one or more embodiments, the signature library is qualified using a distiller, such as the distiller (107) depicted in FIG. 1 above. For example, a signature term is included in the signature library only if the probability of occurrence of the signature term (or the corresponding eligible longest common substring) in the captured payloads of the training set exceeds a pre-determined popularity threshold (e.g., 20%, 50%, 80%, etc.). In another example, a signature term is included in the signature library either if the probability of occurrence of the signature term (or the corresponding eligible longest common substring) in the captured payloads of the training set exceeds the pre-determined popularity threshold or a combined probability of occurrence of the signature term (or the corresponding eligible longest common substring) and another mutually exclusive signature term in the captured payloads of the training set exceeds the pre-determined popularity threshold. Two signature terms are said to be mutually exclusive if they never occur simultaneously in any captured payloads in the entire training set. For example with the pre-determined popularity threshold set at 20%, both the signature term A with 10% probability of occurrence and another mutually exclusive signature term B with 15% probability of occurrence are included in the signature library because the combined probability of occurrence is 25% (i.e., 10%+15%) exceeding the 20% threshold requirement.

In one or more embodiments of the invention, false-positives of using the signature terms in the signature library to identify a network application attached to a newly received flow can be greatly reduced by providing additional context in the signature terms. For example, the signature terms may be supplemented with context relating to the sequence of the signature terms in flow content instead of only considering the signature terms independently. For example, identifying the network application of the newly received flow by the condition "application is X only if flow contains signature term A followed at some later point by signature term B'" produces less false-positives than using the condition "application is X if it contains signature terms A and B'". In one or more embodiments, such ordering relation is expressed using a regular expression. With the exception of few captured payloads in the aforementioned "noise", the majority of the captured payloads in the training set are represented as regular expressions using signature terms in the signature library.

As is known to those skilled in the art, regular expressions can be matched effectively using finite state automata (FSA) that can capture an infinite number of sequences of arbitrary length using finite storage. In one or more embodiments, non-deterministic FSA (referred to as NFA) is used. In Step 205, a NFA is generated using the signature terms in the signature library to represent regular expressions in the training set. These regular expressions and/or the NFA are referred to as the signature of the (port number, transport protocol) pair of the cohesive flow-set or the signature of the main network application for the cohesive flow-set. The process described above from obtaining the cohesive flow-set to generating the NFA is generally referred to as the training phase. As an example using today's computer facilities, the training phase for a flow-set having 5000 flows may be completed in minutes.

In Step 206, a portion of a new flow is matched to the NFA in real time during a classification phase. For example, the new flow may be a flow separate from the cohesive flow-set, such as a flow received or being received subsequent to the training phase. As a result of the matching, a server attached to the new flow is determined as executing the network application associated with the signature.

In one or more embodiments of the invention, the matching process is performed concurrent with receiving the new flow in real time such that the server attached to the new flow may be determined, prior to the new flow being completed by the server, to be executing the network application associated with the signature. In particular, the net work application executing on the server is undetermined prior to obtaining and analyzing the portion of the new flow.

In Step 207, an alert is generated in response to the match if the network application associated with the new flow is previously identified as a malicious application. Accordingly, the new flow may be blocked prior to the server completing a task that is being performed using the new flow. As an example using today's computer facilities, the flow may last from less than a second to up to a few seconds before the server completes a malicious task.

FIGS. 3a-3g shows an example according to aspects of the invention. Specifically, FIGS. 3a-3g depicts an approach to build regular expressions based on the extracted signature terms and use them as network application/protocol signatures. In an example, consider a flow that has two signature terms $t_1$ and $t_2$. The example order that the signature term $t_1$ occurs subsequent to $t_2$ in the flow can be expressed using the regular expression: $s=(.*) t_2 (.*) t_1 (.*)$ where $t_1$ and $t_2$ are separate by intervening wildcard substrings (.*). Note that when classifying a newly received flow, once a match is identified for a sequence of signature terms in the NFA, the flow is classified (or labeled) without needing to match any additional signature terms or sequences in flow content. Hence, the above regular expression can be simplified by eliminating the trailing (.*) as follows: $s=(.*) t_2 (.*) t_1$.

Figure 3A:
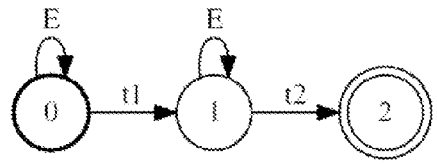
FIGS. 3a-3g shows an example according to aspects of the invention.

A regular expression of the above form can be converted to a matching NFA. FIG. 3a shows the NFA corresponding to above regular expression. The NFA has three states (represented as single or double circles enclosing a name of the state) and the transitions (represented as straight arrows) among states are each labeled with an associated signature term (i.e., $t_1$, $t_2$), when found while sequentially scanning the regular expression, causes the associated transition. State 0 is the start state, state 1 is an intermediate state, and state 2 is an accepting state. An accepting state is represented as a double circle and defined as a possible last state while traversing a NFA (during flow comparison in the classifier). Note that states 0 and 1 have self loops (denoted by "E") corresponding to (.*) in the regular expression.

The NFA can be used to match a sequence of terms that occurs in a flow based on various NFA matching methods, such as (i) backtracking algorithm and (ii) simulating NFA at runtime. For example, the NFA can be simulated at runtime by keeping a set of active states. Initially, the only active state is the start state. As signature terms in the sequence are examined by sequentially scanning the sequence, a new set of active states is created that includes all the states which have an in-coming transition, labeled with the signature term being examined, from any state in the current set of active states. If any of the states in the new set of active states is an accepting state indicating all signature terms in the sequence has been examined, a match is said to be found. That is, the sequence is matched to the NFA and the flow containing the sequence is classified as associated with a server executing a network application having the signature represented by the NFA. Otherwise, this process continues till the complete sequence of signature terms is examined.

The following is an example illustrating the signature generation and flow classification using NFA. Consider that initially MAIL and RCPT are two signature terms extracted from a flow-set. One of the flows in the flow-set has the following payload 1:
EHLO ??? MAIL FROM <abc@xyz.com>?? RCPT TO: <def@pqr.edu>?? DATA??

Figure 3B:
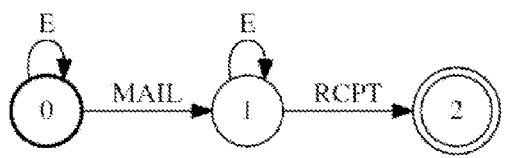

The following regular expression is identified as the application signature from this payload and represented as a corresponding NFA in FIG. 3b.

$S_1=(.*)MAIL(.*)RCPT$

Now assuming that at classification stage the following payload 2 is received:
EHLO ??? MAIL FROM <pqr@lmn.edu>?? RCPT TO: <jkl@uvw.com>?? DATA??

This payload contains the sequence of signature terms <MAIL, RCPT>, and the goal is to see if it can be matched to the NFA in FIG. 3b. Table 2 shows the matching process in detail.

TABLE 2

| Sequence Observed | Set of Active State |
|---|---|
| < > | {0} |
| < MAIL > | {0, 1} |
| < MAIL, RCPT > | {0, 1, 2} |

The first column shows the sequence of signature terms that are found when sequentially scanning the payload 2, and the second column represents all the active states in the NFA in FIG. 3b. The first row shows that before any signature terms are found during the sequentially scanning, the only state that is active is state 0. As can be seen in the second row, when sequential scanning finds the term MAIL, both states 0 and 1 become active. Finally when the sequential scanning finds the complete sequence of signature terms as reflected in third row, all the three states in the NFA are active. However, this set of active states contains an accepting state (i.e., state 2) and hence, this payload is matched to the NFA generated from the Payload-1.

Now consider another payload in the classification stage as the following Payload-3.
HELO ???? RCPT ??? MAIL ????<bbb@pqr.com>???}

TABLE 3

| Sequence Observed | Set of Active State |
|---|---|
| < > | {0} |
| < RCPT > | {0} |
| < RCPT, MAIL > | {0, 1} |

Table 3 shows the sequence and active states for matching Payload-3 against NFA in FIG. 3b. It can be seen that no accepting state is in the set of active states even after the complete sequence is examined. This means that Payload-3 is not accepted by the NFA and therefore, does not match signature $S_1$ above.

Applications typically can operate in several different modes and carry different information. This information is captured in the following example by using payloads from multiple flows to construct a signature. As noted above, a sequence of terms matches the signature if and only if it matches at least one of the several sequences of signature terms in the signature library. In other words, a sequence of terms matches a signature if and only if it is a super-sequence of at least one of the sequence of signature terms in the signature library. A regular expression for two sequences of signature terms can be constructed by first constructing the regular expressions for each signature term sequence and then using the alternation or set union operator (denoted by "|") to combine them. A regular expression containing the alternation operator matches a sequence if the sequence matches either the regular expression before the operator or the regular expression after the operator. For example, two individual regular expressions are extracted from multiple payloads, namely the aforementioned Payload-1 and Payload-3 as below:

$$r_1 = (.*)\text{MAIL}(.*)\text{RCPT}$$

$$r_2 = (.*)\text{RCPT}(.*)\text{MAIL}$$

Assuming the Payload-1 and Payload-3 belongs to two flows in a cohesive flow-set, combined signature can be generated for the main network application of the flow-set from these two regular expressions as below:

$$S_2 = (*)\text{MAIL}(.*)\text{RCPT}|(.*)\text{RCPT}(.*)\text{MAIL}$$

Figure 3C:
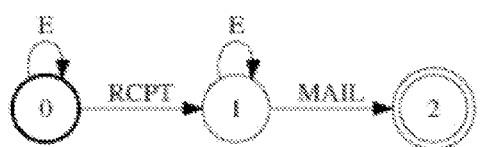
Figure 3D:
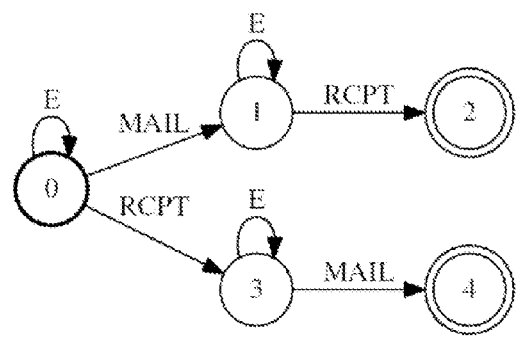

The NFA for the combined signature can be formed by generating the NFA for individual sequences and combining their start states. FIG. 3b and FIG. 3c show the NFA for $r_1$ and $r_2$, respectively. FIG. 3d shows the NFA for the signature $S_2$. Note that the NFA in FIG. 3d now has multiple accepting states. During classification, a match is found as soon as any one of the accepting states is added to the set of active states.

Figure 3E:
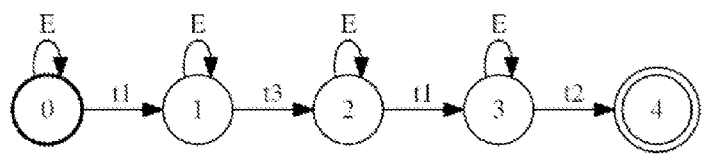

An algorithm for constructing a NFA from a flow-set is described below. First, a method to represent a single flow as a regular expression of signature terms and to construct an NFA from these signature terms is described. A single flow is analyzed first to search for all occurrences of all signature terms. The signature terms that are found in the flow are placed in a sequence according to the order of occurrence in the flow. This sequence of signature terms is converted to a regular expression by preceding each signature term with a wildcard substring (.*). For example, a sequence $<t_1, t_3, t_1, t_2>$ found in a payload is converted to a regular expression (.*) $t_1(.*) t_3(.*) t_1(.*) t_2$. Consider that the number of signature terms in the regular expression is m, which may include repeated signature terms. An equivalent NFA can be created to represent this regular expression by creating a linear sequence of m+1 states. Each of the states except the last one in the linear sequence has a self loop labeled "E". The last state is an accepting state. The NFA corresponding to the regular expression (.*) $t_1(.*) t_3(.*) t_1(.*) t_2$ is shown in FIG. 3e.

A NFA for all the flows in a flow-set can be constructed by creating a NFA for each flow and then performing a standard union operation over the NFAs. Since all the NFAs that are constructed have similar linear structures with self loops "E" on all internal states, this construction can be used that allows generating a single NFA directly. This NFA shares the states whenever two regular expressions have common prefix. The idea is to have a single NFA at any given time for all flows in a flow-set.

Figure 3F:
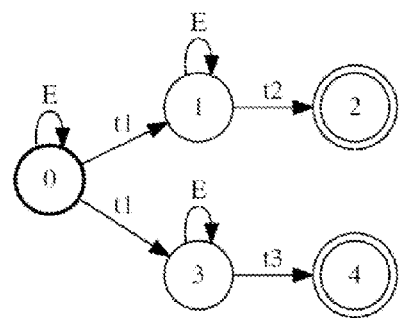
Figure 3G:
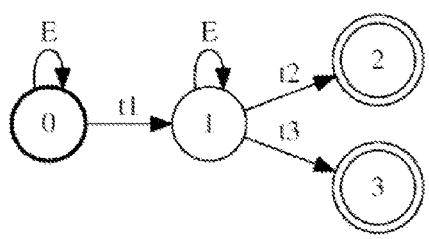

The NFA can be optimized by sharing the states whenever two regular expressions have common prefix. This reduces the number of states in the NFA but does not introduce any new paths in the NFA. This ensures that the matching semantics of the optimized NFA is same as the original NFA. FIG. 3f shows the original NFA generated from the sequences $<t_1, t_2>$ and $<t_2, t_3>$. FIG. 3g shows the optimized NFA with one fewer state than the NFA shown in FIG. 3f. The savings can be significant when generating a signature from large number of flow payloads.

An example algorithm to construct the NFA is shown in TABLE 4 below. The inputs to the algorithm are all the flows in a flow-set (i.e., the set of training flows F) and the set of signature terms (referred to as eligible terms) for the flow-set. First, for every flow in the flow-set, the eligible terms are sorted in the order of occurrence in the payload (line 12). The algorithm iterates through each of these eligible terms in the order of occurrence in the flow payload and builds the state machine starting from state 0 every time (line 10). If the transitions (i.e. the terms) are already part of the state machine, then the pointer to the current state is just forwarded (lines 15). However, if the transition and state do not exist, then they are added to the existing state machine (lines 17-20). If the term that is being examined is the last one in the sorted sequence in the flow payload, then the next state is made into an accepting state (line 22); otherwise a self loop "E" is added as the next state. Finally, after iterating through all the flow content streams from the training flow-set, the final state machine is returned (line 30).

TABLE 4

| | |
|---|---|
| 1: | Parameters; F /* Set of training flows */ |
| 2: | Parameters: E /* Set of eligible terms */ |
| 3: | state_label = 0 |
| 4: | current_state = create_new_state(state_label); |
| 5: | state_label + +; |
| 6: | accepting_states = { }; |
| 7: | state_list = {current_state}; |
| 8: | state_machine = { } |
| 9: | for f ∈ F do |
| 10: | current_state = 0; |
| 11: | /* Sort terms in terms of increasing order of the index of the term in the flow */ |
| 12: | T = sortTerms(f, E); |
| 13: | for t ∈ T do |
| 14: | if hasTransition(current_state, t) then |
| 15: | next_state = get_next_state(current_state, t) |
| 16: | else |
| 17: | next_state = create_new_state (state_label); |
| 18: | state_label + +; |
| 19: | state_list = state_list ∪ {next_state} |
| 20: | state_machine = state_machine ∪ {[current_state, t] → next_state}; |
| 21: | if isLastTermInSequence(t) then |
| 22: | accepting_states = accepting_states ∪ {next_state} |
| 23: | else |
| 24: | state_machine = state_machine ∪ {[next_state, Σ] → next_state}; |
| 25: | end if |
| 26: | end if |
| 27: | current_state = next_state |
| 28: | end for |
| 29: | end for |
| 30: | return state_machine |

Although specific formats or structures are used as examples in the foregoing description regarding the flows, the captured payloads, the signature terms, the NFA, etc., one skilled in the art, with the benefit of this disclosure, will recognize that other formats or structures may also be used in the system and methods described without deviating from the spirit of the invention.

Figure 4:
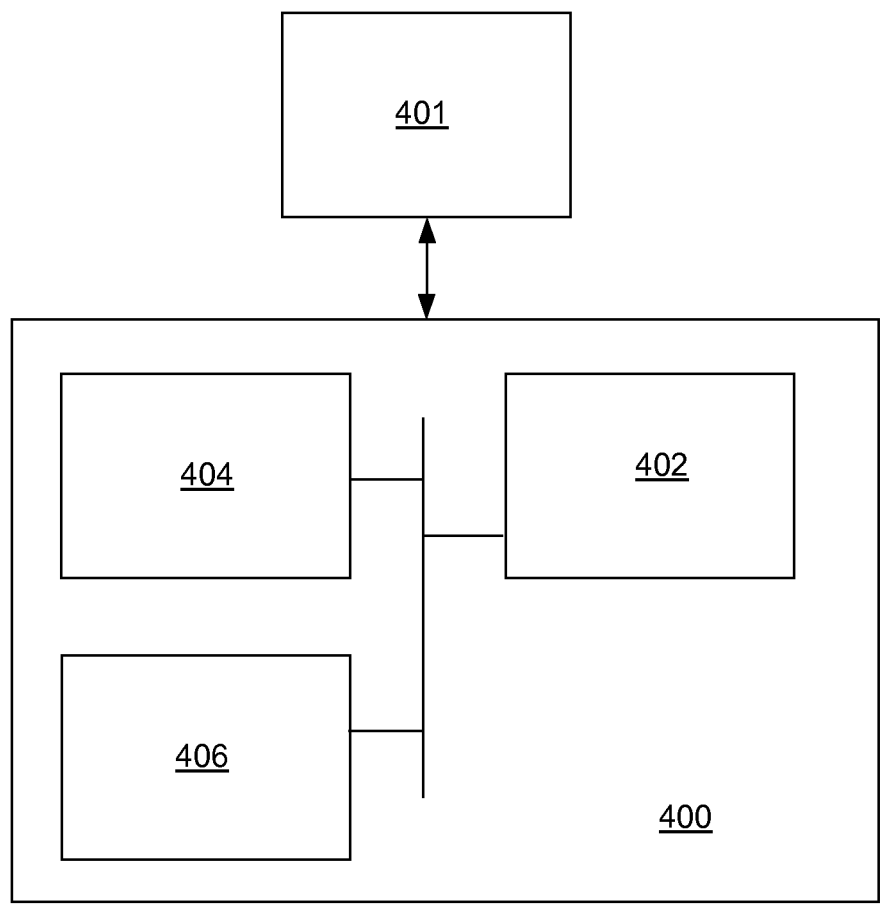
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for profiling network traffic of a network, comprising:
   obtaining, from the network traffic, a plurality of flows generated by a plurality of servers executing one or more network applications in the network, wherein a five tuple comprising a source IP-address, a destination IP-address, a source port, a destination port, and a transport protocol is same for each of a plurality of packets in a first flow of the plurality of flows;
   identifying, using a processor of a computer system, a training set from the plurality of flows by:
      determining that a pair comprising a port number and the transport protocol is same for each of the plurality of flows;
      determining a number of servers for the plurality of servers as exceeding a pre-determined server diversity threshold;
      determining a number of flows for the plurality of flows as exceeding a pre-determined training set size threshold; and
      determining a statistical deviation in contributions of each of the plurality of servers to the plurality of flows as being less than a pre-determined server contribution deviation threshold,
      wherein the training set comprises a plurality of captured payloads corresponding to the plurality of flows;
   identifying, from the one or more network applications based on a pre-determined criterion, a unique network application associated with the port number and the transport protocol, wherein a portion of the plurality of flows associated with at least a first server of the plurality of servers is generated responsive to at least the first server executing the unique network application;
   determining, using the processor and from the training set that exceeds the pre-determined training set size threshold, a first signature term of the unique network application based on a first pre-determined algorithm; and
   determining, using the processor, a second server in the network as executing the unique network application by analyzing, based on at least the first signature term, a second flow generated by the second server.

2. The method of claim 1,
   wherein the port number of the pair corresponds to the source port of the five tuple,
   wherein the source IP-address of the five tuple is associated with the first server executing the unique network application, and
   wherein the plurality of packets in the first flow are sent from the first server to a client to execute the unique network application.

3. The method of claim 1,
   wherein the port number of the pair corresponds to the destination port of the five tuple,
   wherein the destination IP-address of the five tuple is associated with the first server executing the unique network application, and
   wherein the plurality of packets in the first flow are sent from a client to the first server to execute the unique network application.

4. The method of claim 1, wherein determining the statistical deviation in contributions of each of the plurality of servers to the plurality of flows as being less than the pre-determined server contribution deviation threshold comprises determining, for said each of the plurality of servers, a number of flows associated with said each server in the plurality of flows as being less than a pre-determined maximum number.

5. The method of claim 1, wherein the unique network application is identified based on the unique network application executing on more servers in the plurality of servers than any other network application in the one or more network applications.

6. The method of claim 1, wherein the unique network application comprises a layer-seven application.

7. A method for profiling network traffic of a network, comprising:
   obtaining, from the network traffic, a plurality of flows associated with a plurality of servers executing one or more network applications in the network, wherein a five tuple comprising a source IP-address, a destination IP-address, a source port, a destination port, and a transport protocol is same for each of a plurality of packets in a first flow of the plurality of flows;
   identifying, using a processor of a computer system, a training set from the plurality of flows by:
      determining that a pair comprising a port number and the transport protocol is same for each of the plurality of flows;
      determining a number of servers for the plurality of servers as exceeding a pre-determined server diversity threshold;

determining a number of flows for the plurality of flows as exceeding a pre-determined training set size threshold; and determining a statistical deviation in contributions of each of the plurality of servers to the plurality of flows as being less than a pre-determined server contribution deviation threshold, wherein the training set comprises a plurality of captured payloads corresponding to the plurality of flows;

identifying, from the one or more network applications based on a pre-determined criterion, a unique network application associated with the port number and the transport protocol, wherein a portion of the plurality of flows associated with at least a first server of the plurality of servers is generated responsive to at least the first server executing the unique network application;

determining, using the processor and from the training set, a first signature term of the unique network application based on a first pre-determined algorithm, wherein determining the first signature term of the unique network application comprises:

dividing the plurality of captured payloads into a plurality of groups;

identifying a first longest common substring of two or more captured payloads in a first group of the plurality of groups using a second pre-determined algorithm; and determining the first longest common substring as the first signature term based on a first probability of occurrence of the first longest common substring in the plurality of captured payloads exceeding a pre-determined noise threshold; and determining, using the processor, a second server in the network as executing the unique network application by analyzing, based on at least the first signature term, a second flow associated with the second server.

8. The method of claim 7, further comprising:

obtaining a plurality of longest common substrings by identifying one or more longest common substring of each pair of captured payloads in each of the plurality of groups, wherein the plurality of longest common substrings comprises the first longest common substring identified from the first group and a second longest common substring identified from a second group of the plurality of groups.

9. The method of claim 8, further comprising:

including the first signature term in a set of signature terms determined from the plurality of longest common substrings;

representing each of two or more captured payloads of the plurality of captured payloads as a regular expression to obtain a plurality of regular expressions, each comprising one or more signature terms in the set of signature terms; and representing the plurality of regular expressions as a non-deterministic finite automaton (NFA), wherein determining the second server in the network as executing the unique network application is by analyzing the second flow associated with the second server based on the NFA.

10. The method of claim 9, wherein the first signature term is included in the set of signature terms based on the first probability of occurrence of the first longest common substring in the plurality of captured payloads exceeding a pre-determined popularity threshold, wherein a second signature terms and a third signature term are included in the set of signature terms based on:

a second probability of occurrence of the second signature term in the plurality of captured payloads exceeding the noise threshold, a third probability of occurrence of the third signature term in the plurality of captured payloads exceeding the noise threshold, a combined probability of occurrence of the second signature term and the third signature term in the plurality of captured payloads exceeding the pre-determined popularity threshold, and the second signature term and the third signature being mutually exclusive in any one captured payload of the plurality of captured payloads.

11. The method of claim 9, further comprising:

generating the NFA during a training phase to represent the plurality of regular expressions, wherein the plurality of flows are obtained from the network traffic during the training phase, wherein the set of signature terms are compiled during the training phase;

obtaining a portion of the second flow from the network traffic subsequent to the training phase; and analyzing the portion of the second flow based on the NFA to determine, prior to the second flow being completed by the second server, the second server as executing the unique network application, wherein the second server is not determined, prior to obtaining the portion of the second flow, as executing the unique network application.

12. A system for profiling network traffic of a network, comprising:

a data collector configured to obtain, from the network traffic, a plurality of flows generated by a plurality of servers executing one or more network applications in the network, wherein a five tuple comprising a source IP-address, a destination IP-address, a source port, a destination port, and a transport protocol is same for each of a plurality of packets in a first flow of the plurality of flows;

a statistical analyzer configured to identify a training set from the plurality of flows by:

determining that a pair comprising a port number and the transport protocol is same for each of the plurality of flows;

determining a number of servers for the plurality of servers as exceeding a pre-determined server diversity threshold;

determining a number of flows for the plurality of flows as exceeding a pre-determined training set size threshold; and determining a statistical deviation in contributions of each of the plurality of servers to the plurality of flows as being less than a pre-determined server contribution deviation threshold, wherein the training set comprises a plurality of captured payloads corresponding to the plurality of flows;

a signature generator configured to extract, from the training set that exceeds the pre-determined training set size threshold, a first signature term based on a first pre-determined algorithm; and a processor and memory storing instructions when executed by the processor comprising functionalities to:

identify, from the one or more network applications based on a pre-determined criterion, a unique network application associated with the port number and the transport protocol, wherein a portion of the plurality of flows associated with at least a first server of the plurality of servers is generated responsive to at least the first server executing the unique network application; and determine a second server in the network as executing the unique network application by analyzing, based on at least the first signature term, a second flow generated by the second server.

13. The system of claim 12,
wherein the port number of the pair corresponds to the source port of the five tuple,
wherein the source IP-address of the five tuple is associated with the first server executing the unique network application, and
wherein the plurality of packets in the first flow are sent from the first server to a client to execute the unique network application.

14. The system of claim 12,
wherein the port number of the pair corresponds to the destination port of the five tuple,
wherein the destination IP-address of the five tuple is associated with the first server executing the unique network application, and
wherein the plurality of packets in the first flow are sent from a client to the first server to execute the unique network application.

15. The system of claim 12, wherein determining the statistical deviation in contributions of each of the plurality of servers to the plurality of flows as being less than the pre-determined server contribution deviation threshold comprises determining, for said each of the plurality of servers, a number of flows associated with said each server in the plurality of flows as being less than a pre-determined maximum number.

16. The system of claim 12, wherein the unique network application is identified based on the unique network application executing on more servers in the plurality of servers than any other network application in the one or more network applications.

17. The system of claim 12, wherein the unique network application comprises a layer-seven application.

18. A system for profiling network traffic of a network, comprising:
a data collector configured to obtain, from the network traffic, a plurality of flows associated with a plurality of servers executing one or more network applications in the network, wherein a five tuple comprising a source IP-address, a destination IP-address, a source port, a destination port, and a transport protocol is same for each of a plurality of packets in a first flow of the plurality of flows;
a statistical analyzer configured to identify a training set from the plurality of flows by:
determining that a pair comprising a port number and the transport protocol is same for each of the plurality of flows;
determining a number of servers for the plurality of servers as exceeding a pre-determined server diversity threshold;
determining a number of flows for the plurality of flows as exceeding a pre-determined training set size threshold; and
determining a statistical deviation in contributions of each of the plurality of servers to the plurality of flows as being less than a pre-determined server contribution deviation threshold, wherein the training set comprises a plurality of captured payloads corresponding to the plurality of flows;
a signature generator configured to determine, from the training set, a first signature term based on a first pre-determined algorithm, wherein determining the first signature term comprises:
dividing the plurality of captured payloads into a plurality of groups;
identifying a first longest common substring of two or more captured payloads in a first group of the plurality of groups using a pre-determined algorithm; and
determining the first longest common substring as the first signature term based on a first probability of occurrence of the first longest common substring in the plurality of captured payloads exceeding a pre-determined noise threshold; and
a processor and memory storing instructions when executed by the processor comprising functionalities to:
identify, from the one or more network applications based on a pre-determined criterion, a unique network application associated with the port number and the transport protocol, wherein a portion of the plurality of flows associated with at least a first server of the plurality of servers is generated responsive to at least the first server executing the unique network application; and
determine a second server in the network as executing the unique network application by analyzing, based on at least the first signature term, a second flow associated with the second server.

19. The system of claim 18, the signature generator further configured to:
obtain a plurality of longest common substrings by identifying one or more longest common substring of each pair of captured payloads in each of the plurality of groups,
wherein the plurality of longest common substrings comprises the first longest common substring identified from the first group and a second longest common substring identified from a second group of the plurality of groups.

20. The system of claim 19, the signature generator further configured to:
represent each of two or more captured payloads of the plurality of captured payloads as a regular expression to obtain a plurality of regular expressions, each comprising one or more signature terms in a set of signature terms determined from the plurality of longest common substrings, wherein the set of signature terms comprises the first signature term; and
represent the plurality of regular expressions as a nondeterministic finite automaton (NFA),
wherein determining the second server in the network as executing the unique network application is by analyzing the second flow associated with the second server based on the NFA.

21. The system of claim 20, further comprising:
a signature library comprising the set of signature terms; and
a distiller configured to:
include the first signature term in the set of signature terms based on the first probability of occurrence of the first longest common substring in the plurality of captured payloads exceeding a pre-determined popularity threshold; and include a second signature terms and a third signature term in the set of signature terms based on:
  a second probability of occurrence of the second signature term in the plurality of captured payloads exceeding the noise threshold,
  a third probability of occurrence of the third signature term in the plurality of captured payloads exceeding the noise threshold,
  a combined probability of occurrence of the second signature term and the third signature term in the plurality of captured payloads exceeding the pre-determined popularity threshold, and
  the second signature term and the third signature being mutually exclusive in any one captured payload of the plurality of captured payloads.

22. The system of claim 20,
wherein the data collector is further configured to obtain a portion the second flow from the network traffic,
wherein the signature analyzer is further configure to analyze the portion of the second flow based on the NFA to determine, prior to the second flow being completed by the second server, the second server as executing the unique network application, and
wherein the second server is not determined, prior to obtaining the portion of the second flow, as executing the unique network application.

23. A non-transitory computer readable medium embodying instructions for profiling network traffic of a network, the instructions when executed by a processor comprising functionality for:
  obtaining, from the network traffic, a plurality of flows generated by a plurality of servers executing one or more network applications in the network, wherein a five tuple comprising a source IP-address, a destination IP-address, a source port, a destination port, and a transport protocol is same for each of a plurality of packets in a first flow of the plurality of flows;
  identifying a training set from the plurality of flows based on a first pre-determined algorithm, wherein the training set comprises a plurality of captured payloads corresponding to the plurality of flows;
  identifying, from the one or more network applications based on a pre-determined criterion, a unique network application associated with the port number and the transport protocol, wherein a portion of the plurality of flows associated with at least a first server of the plurality of servers is generated responsive to at least the first server executing the unique network application;
  determining, from the training set that exceeds the pre-determined training set size threshold, a first signature term of the unique network application by:
    dividing the plurality of captured payloads into a plurality of groups;
    identifying a first longest common substring of two or more captured payloads in a first group of the plurality of groups using a second pre-determined algorithm; and
    determining the first longest common substring as the first signature term based on a first probability of occurrence of the first longest common substring in the plurality of captured payloads exceeding a pre-determined noise threshold; and
  determining a second server in the network as executing the unique network application by analyzing, based on at least the first signature term, a second flow generated by the second server.

24. The non-transitory computer readable medium of claim 23, wherein identifying the training set from the plurality of flows comprises:
  determining that a pair comprising a port number and the transport protocol is same for each of the plurality of flows;
  determining a number of servers for the plurality of servers as exceeding a pre-determined server diversity threshold;
  determining a number of flows for the plurality of flows as exceeding a pre-determined training set size threshold; and
  determining a statistical deviation in contributions of each of the plurality of servers to the plurality of flows as being less than a pre-determined server contribution deviation threshold.

25. The non-transitory computer readable medium of claim 24,
wherein the port number of the pair corresponds to the source port of the five tuple,
wherein the source IP-address of the five tuple is associated with the first server executing the unique network application, and
wherein the plurality of packets in the first flow are sent from the first server to a client to execute the unique network application.

26. The non-transitory computer readable medium of claim 24,
wherein the port number of the pair corresponds to the destination port of the five tuple,
wherein the destination IP-address of the five tuple is associated with the first server executing the unique network application, and
wherein the plurality of packets in the first flow are sent from a client to the first server to execute the unique network application.

27. The non-transitory computer readable medium of claim 24, wherein determining the statistical deviation in contributions of each of the plurality of servers to the plurality of flows as being less than the pre-determined server contribution deviation threshold comprises determining, for said each of the plurality of servers, a number of flows associated with said each server in the plurality of flows as being less than a pre-determined maximum number.

28. The non-transitory computer readable medium of claim 24, wherein the unique network application is identified based on the unique network application executing on more servers in the plurality of servers than any other network application in the one or more network applications.

29. The non-transitory computer readable medium of claim 24, wherein the unique network application comprises a layer-seven application.

30. A non-transitory computer readable medium embodying instructions for profiling network traffic of a network, the instructions when executed by a processor comprising functionality for:
  obtaining, from the network traffic, a plurality of flows that are generated by a plurality of servers executing one or more network applications in the network, wherein a five tuple comprising a source IP-address, a destination IP-address, a source port, a destination port, and a transport protocol is same for each of a plurality of packets in a first flow of the plurality of flows;
  identifying a training set from the plurality of flows based on a first pre-determined algorithm, wherein the training set comprises a plurality of captured payloads corresponding to the plurality of flows;

identifying, from the one or more network applications based on a pre-determined criterion, a unique network application associated with the port number and the transport protocol, wherein a portion of the plurality of flows associated with at least a first server of the plurality of servers is generated responsive to at least the first server executing the unique network application;

determining, from the training set, a first signature term of the unique network application by:
  dividing the plurality of captured payloads into a plurality of groups;
  obtaining a plurality of longest common substrings by identifying one or more longest common substring of each pair of captured payloads in each of the plurality of groups;
  identifying a first longest common substring of two or more captured payloads in a first group of the plurality of groups using a second pre-determined algorithm, wherein the plurality of longest common substrings comprises the first longest common substring identified from the first group and a second longest common substring identified from a second group of the plurality of groups; and
  determining the first longest common substring as the first signature term based on a first probability of occurrence of the first longest common substring in the plurality of captured payloads exceeding a pre-determined noise threshold; and determining a second server in the network as executing the unique network application by analyzing, based on at least the first signature term, a second flow associated with the second server.

31. The non-transitory computer readable medium of claim 30, the instructions when executed by the processor further comprising functionality for:
  including the first signature term in a set of signature terms determined from the plurality of longest common substrings;
  representing each of two or more captured payloads of the plurality of captured payloads as a regular expression to obtain a plurality of regular expressions, each comprising one or more signature terms in the set of signature terms; and
  representing the plurality of regular expressions as a non-deterministic finite automaton (NFA),
  wherein determining the second server in the network as executing the unique network application is by analyzing the second flow associated with the second server based on the NFA.

32. The non-transitory computer readable medium of claim 31, the instructions when executed by the processor further comprising functionality for:
  wherein the first signature term is included in the set of signature terms based on the first probability of occurrence of the first longest common substring in the plurality of captured payloads exceeding a pre-determined popularity threshold,
  wherein a second signature terms and a third signature term are included in the set of signature terms based on:
    a second probability of occurrence of the second signature term in the plurality of captured payloads exceeding the noise threshold,
    a third probability of occurrence of the third signature term in the plurality of captured payloads exceeding the noise threshold,
    a combined probability of occurrence of the second signature term and the third signature term in the plurality of captured payloads exceeding the pre-determined popularity threshold, and
    the second signature term and the third signature being mutually exclusive in any one captured payload of the plurality of captured payloads.

33. The non-transitory computer readable medium of claim 31, the instructions when executed by the processor further comprising functionality for:
  generating the NFA during a training phase to represent the plurality of regular expressions, wherein the plurality of flows are obtained from the network traffic during the training phase, wherein the set of signature terms are compiled during the training phase;
  obtaining a portion of the second flow from the network traffic subsequent to the training phase; and
  analyzing the portion of the second flow based on the NFA to determine, prior to the second flow being completed by the second server, the second server as executing the unique network application,
  wherein the second server is not determined, prior to obtaining the portion of the second flow, as executing the unique network application.

* * * * *